Figure 1:
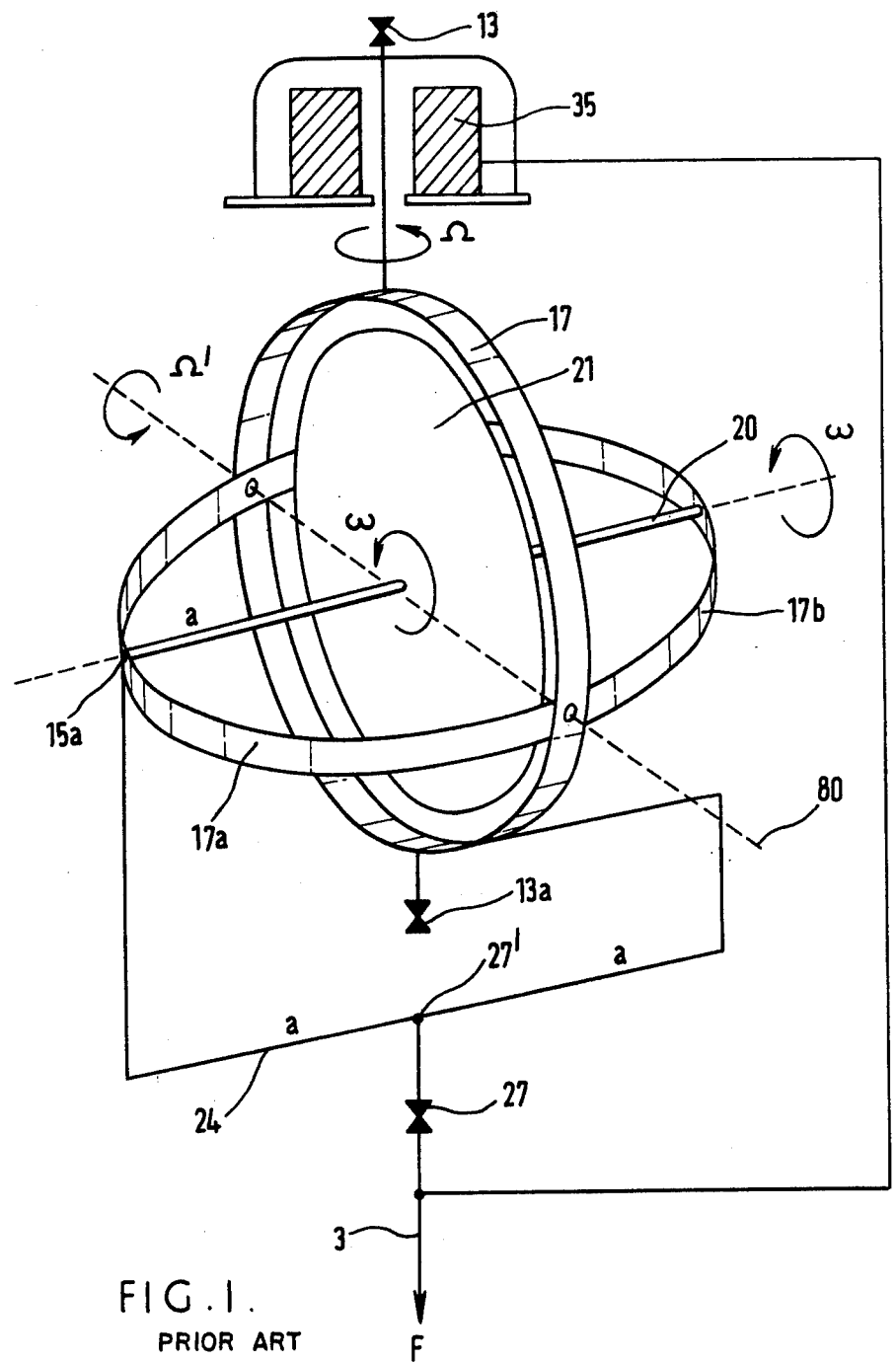

United States Patent [19]

Wöhrl

[11] 4,095,463
[45] Jun. 20, 1978

[54] DYNAMOMETER CELL

[75] Inventor: Josef Wöhrl, Pfedelbach, Germany

[73] Assignee: Eric Thomas Scriven, Wheathampstead, England; a part interest

[21] Appl. No.: 632,892

[22] Filed: Nov. 17, 1975

[51] Int. Cl.² .............................................. G01L 5/00
[52] U.S. Cl. ................................................. 73/141 R
[58] Field of Search ........................... 73/141 R, 133; 177/DIG. 9; 74/5.22

[56] References Cited

U.S. PATENT DOCUMENTS 841,612   1/1907   Kaempfe ..................... 177/DIG. 9

FOREIGN PATENT DOCUMENTS 2,235,808   2/1974   Germany ..................... 73/141 R
2,055,794   5/1972   Germany ..................... 73/141 R Primary Examiner—Anthony V. Ciarlante
Attorney, Agent, or Firm—Ladas, Parry, Von Gehr, Goldsmith & Deschamps

[57] ABSTRACT

A dynamometer cell consists of a gyroscope of which the precessional motion induced by the force to be measured is a measure of that force. In order to apply the force to a lever of which one end is movably mounted on an inner gyroscope gimbal while the other end is similarly mounted on an outer gyroscope gimbal a vertically rotatably mounted suspension member is provided. The non-precessing end of this suspension member includes a support member to which a load lever is hingedly attached and to which lever the force to be measured is directly or indirectly applied. With the object of avoiding or at least reducing undesirable oscillations of the lever the support member consists of at least two parts adapted to be mutually mobile by means of bearing members provided therebetween.

2 Claims, 6 Drawing Figures

DYNAMOMETER CELL

This invention relates to a dynamometer cell in which the load is determined by measuring the precession rate of a gyroscope on which the load acts.

A dynamometer cell of this type is described in German Patent Specification No. 2,055,794, and the principle of its operation will be described below with reference to FIG. 1 of the accompanying drawings which is a schematic illustration of the dynamometer cell described in the said German Patent. Only those parts necessary for an understanding of the principle are shown. The reference numerals used to indicate the various parts correspond to the numerals used in the description of the German Patent particularly FIGS. 2, 3 and 4 thereof.

The cell is based on a gyroscope which consists of a rotor 21 which rotates on an axle 20, and is driven at a constant angular velocity ($\omega$) by a motor which is not shown. The rotor axle 20 is mounted in an inner gyroscope gimbal 17a, 17b, and this inner gimbal is mounted in an outer gimbal 17. The outer gimbal is supported on bearings 13, 13a so that it can rotate freely about a vertical axis.

It is a property of gyroscopes that, when rotating, they tend to remain at a fixed position in space until an external force acts upon them. In the present case, if an external force F acts on the inner gimbal 17a at the point 15a, a precessional movement will occur about the vertical axis through the bearings 13, 13a. The rate of this precessional motion will be proportional to the applied force F.

The force F is actually applied to the gyroscope via a lever 24. One end of this lever is attached at point 15a to gimbal 17a, and the other end is attached to the outer gimbal 17 on the vertical axis between bearings 13, 13a. It will therefore be seen that when the unit is operating, a downward force equal to F/2, since the point of attachment 27′ is halfway along lever 24, will be exerted at point 15a, causing precession, and a downward force F/2 will also be exerted above bearings 13a, but will be resisted by the normal reaction there. The lever 24 will thus rotate with the gyroscope. To avoid the force or load F having to rotate, a swivel joint 27 is interposed between the lever 24 and the load, and the suspension member 3 is therefore non-precessing.

The moment of inertia of the gyroscope and the friction in the bearings of the gyroscope gimbals cause a secondary precession which produces a rotation $\Omega'$ about the axis 80. This is undesirable, because thereby the resulting measurement is falsified. To overcome this, an auxiliary motor 35 operates to load opposite ends of the axle 20 alternately, so that the direction of primary precession is reversed on each change of loading. The "average" produced by readings in two directions substantially cancels out the influence of the secondary precession.

In such known cells, and in the dynamometer cell shown in German Patent Specification No. 2,119,546, the force under investigation acts on a lever, which has a knife edge at one end resting in a socket which is fixed to a cross-member on the non-precessing suspension member.

With these known dynamometer cells the knife edge of the loading lever, which bears against the support of the non-precessing end of the rotatably mounted suspension member, performs undesirable oscillations at right angles. These oscillations are transferred via the socket to the non-precessing end of the rotatably mounted suspension member, with the result that the latter has no definite point of application of force in relation to the lever mounted on the gyroscope, which leads to undesirable errors in measurement. The measurement errors increase with the amplitude of the oscillations and ultimately become so large, particularly if the system goes into resonance, that it becomes impossible to carry out force measurements. When the bearing of the suspension member is under load and particularly if this is very heavy owing to the magnitude of the force being measured, these undesirable oscillations force the normally non-precessing end of the suspension member into an undesirable rotatory movement about the vertical axis. This undesirable rotatory movement can lead to the dynamometer cell having to be taken out of operation in order to avoid it being damaged or even destroyed.

The object of the invention is to obviate the drawbacks of the known arrangement and to provide a dynamometer cell, in which the deleterious effects on the measurements due to undesirable movements of the loading lever are either avoided or at least reduced to such a low level that they have no effect upon the measurements.

This object may be achieved in accordance with the invention in the case of a dynamometer cell of the type set forth at the outset, in that the support member, to which the loading lever is hingedly attached, consists of at least two parts adapted to be mutually mobile by means of bearing members provided therebetween. According to a further feature this mobile mounting is achieved in that the facing surfaces of the two parts are mounted in spaced relation to one another by means of at least one ball located in spheroidal depressions in said surfaces.

The dynamometer cell according to the invention has the advantage that undesirable movements of the load lever have little or no effect upon the non-precessing end of the rotatably mounted suspension member, so that errors in the readings are avoided. Moreover, the dynamometer cell according to the invention ensures a much more certain and reliable mode of operation, so that the number of necessary controls, readjustments and recalibrations can be considerably reduced.

The invention will now be more fully explained with reference to the embodiments shown in the accompanying drawings, in which like parts are denoted by like reference numerals.

In the drawings:

FIG. 1 shows a prior art device.

Figure 2:
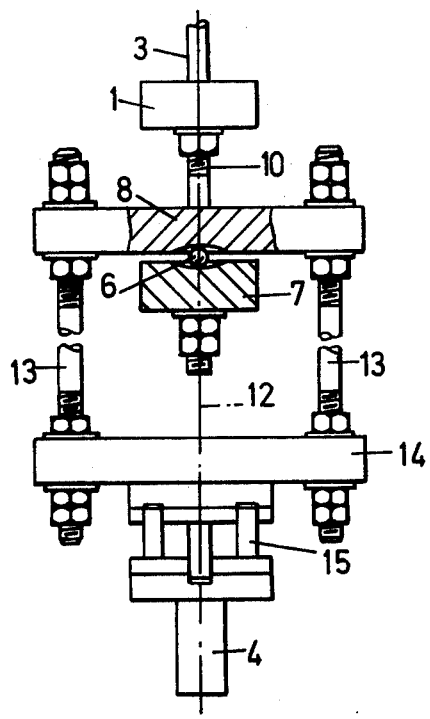
Figure 3:
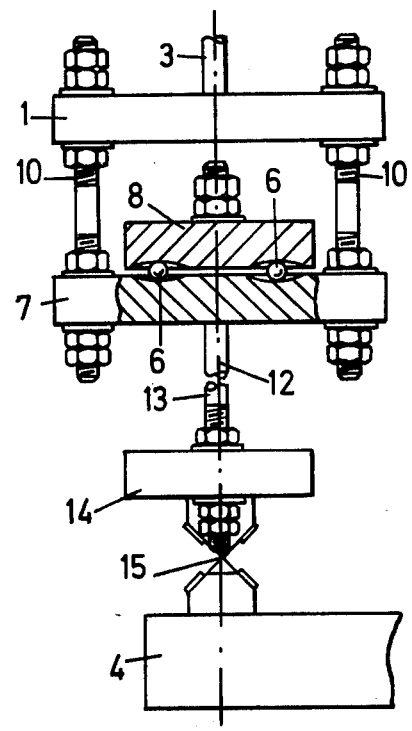

FIGS. 2 and 3 respectively show a front elevation and a side elevation (both partly sectionalized) of an embodiment of the dynamometer cell according to the invention.

Figure 4:
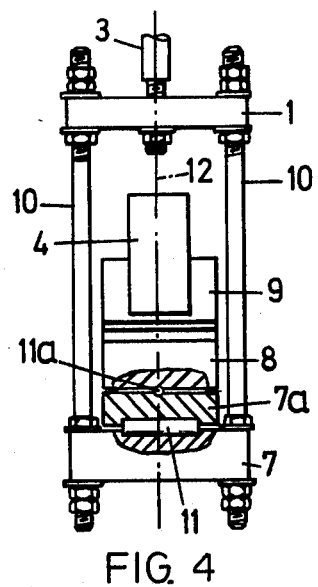
Figure 5:
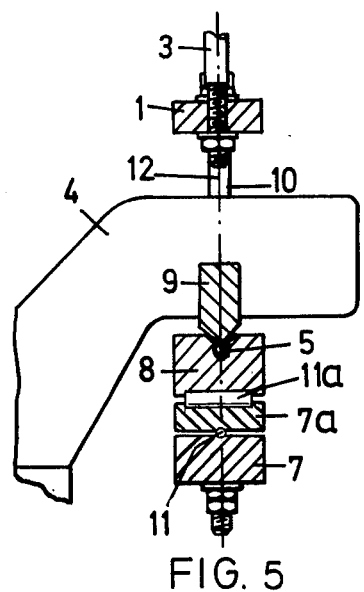

FIGS. 4 and 5 respectively show a front elevation partly in section and a sectionalized side elevation of another embodiment.

In FIGS. 1 and 2 a cross-member 1 with suspension members 10 is fixed to the lower, non-precessing end 3 of the vertically rotatably mounted suspension device which depends from a lever (not shown), one end of which is movably mounted on the inner gyroscope gimbal and the other end similarly mounted on the outer gyroscope gimbal. Together with the upper cross-member 8 and the suspension members 13 the cross-member 7 forms the support for the hinge member, the cross-spring pivot 15. This pivot 15 connects the transmission member, the lever 4, against which the force to be measured is applied directly or indirectly, with the part 8 via a cross-member 14 below the suspension members 13. By suitably designing this part 8 the cross-spring pivot 15 may also be made to engage directly — without the intervention of the suspension member — with member 8. The two members 7 and 8 have spheriodal depressions. In the embodiment shown, these depressions are located symmetrically in relation to the planes defined by the centre lines of the parts 7 and 8 and the vertical axis. A ball 6 is located in each depression, so as to space the member 7 somewhat from the member 8. Instead of using two balls there may be more; for example four balls may be located in suitable depressions. The mobile mounting may also be achieved by a single ball interposed centrally between the two members 7 and 8. An additional supporting member — similar to that described with reference to the embodiment of FIGS. 4 and 5 — may also be provided between the two members 7 and 8.

In the embodiment shown in FIGS. 4 and 5, the rollers 11 constitute the bearing elements. The lower non-precessing end 3 of the rotatably mounted suspension device is once more secured to the cross-member 1 connecting the suspension members 10. The bottom cross-member 7 of this suspension unit is provided with a recess, in which two rollers 11 are located symmetrically to the plane through the vertical axis. A support member 7a, which is recessed both on its lower and upper sides, rests on these rollers 11. Two further rollers 11a, which are arranged at right angles to the first pair, are located in the upper recess. The member 8, which is similarly recessed rests on the rollers 11a. The member 8, together with the members 7 and 7a forms the support for the hinge element which is a knife edge 9, and is provided with a socket in the slot of which a ball 5 is located. The knife edge 9 is fixed to the lever 4, to which the force to be measured is applied directly or indirectly.

Instead of using a rigid connection between the lower non-precessing portion of the rotatably mounted suspension device and the cross-member of the suspension unit, a flexible connection such as for example a hook-type connection or a cross-spring pivot could be provided.

By subdividing the support for the hinge element into two or more members, (7, 7a, 8) undesirable movements, which are transmitted from the load lever 4 to the socket of the member 7, and from member 8 and consequently also from the lower end 3 of the rotatably mounted suspension device, are almost eliminated.

I claim:
1. A dynamometer cell comprising a gyroscope having a gyroscope rotor and inner and outer gyroscope gimbals supporting the rotor, a motor for rotating the gyroscope rotor at a constant speed, lever means, reacting between the inner and outer gyroscope gimbals, to which a force to be measured is applied to induce a primary precessional motion of the gyroscope, a linkage between the lever means and the point of application of the force, and means arranged between the lever means and the linkage to prevent transmission of the primary precessional motion from the lever means to the linkage, which linkage comprises at least two parts with at least one bearing member between facing surfaces of the parts, said bearing member being able to move relative to both parts to permit relative movement between the parts in a plane normal to the direction in which the force is transmitted to the linkage between the respective facing surfaces irrespective of the position of said lever means.

2. A dynamometer cell as claimed in claim 1, wherein the facing surfaces of said parts are spaced from one another by at least one ball located in spheroidal depressions in said surfaces.

* * * * *